(12) United States Patent  
Murata

(10) Patent No.: US 7,607,464 B2  
(45) Date of Patent: Oct. 27, 2009

(54) PNEUMATIC TIRE HAVING CIRCUMFERENTIAL GROOVES AND OBLIQUE GROOVES

(75) Inventor: Takehiko Murata, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 481 days.

(21) Appl. No.: 11/284,894

(22) Filed: Nov. 23, 2005

(65) Prior Publication Data

US 2006/0130950 A1  Jun. 22, 2006

(30) Foreign Application Priority Data

Nov. 25, 2004  (JP)  ............................. 2004-340824

(51) Int. Cl.  
*B60C 11/13*  (2006.01)
(52) U.S. Cl. ............................ 152/209.24; 152/209.27; 152/209.28
(58) Field of Classification Search ............ 152/209.18, 152/209.24, 209.27, 209.28  
See application file for complete search history.

(56) References Cited

U.S. PATENT DOCUMENTS

| | | | |
|---|---|---|---|
| 4,114,671 A * | 9/1978 | Maiocchi et al. ....... | 152/209.21 |
| 6,371,180 B1 * | 4/2002 | Hayashi ................. | 152/209.28 |
| 6,488,064 B1 * | 12/2002 | Radulescu ............. | 152/209.18 |
| 2005/0076985 A1 * | 4/2005 | Colombo et al. ....... | 152/209.18 |
| 2005/0092413 A1 * | 5/2005 | Miyazaki ................ | 152/209.24 |
| 2006/0137791 A1 * | 6/2006 | Miyabe et al. .......... | 152/209.18 |
| 2007/0006955 A1 * | 1/2007 | Fukunaga ............... | 152/209.24 |

FOREIGN PATENT DOCUMENTS

| | | | |
|---|---|---|---|
| JP | 06-199109 | * | 7/1994 |
| JP | 07-076205 | * | 3/1995 |
| JP | 09-011708 | * | 1/1997 |
| JP | 10-024705 | * | 1/1998 |
| JP | 2003-146024 | * | 5/2003 |
| JP | 2004-210189 A | | 7/2004 |
| WO | WO 02/078982 | * | 10/2002 |

* cited by examiner

*Primary Examiner*—Steven D Maki  
(74) *Attorney, Agent, or Firm*—Birch, Stewart, Kolasch & Birch, LLP

(57) ABSTRACT

A pneumatic tire is provided with a pair of circumferential grooves (3) arranged in both sides of a tire equator (C), and a plurality of oblique grooves (4) having a steep decline portion (4a) extending to an outer side in a tire axial direction at an angle (q1) between 15 and 45 degree with respect to a tire circumferential direction from a position near the circumferential groove (3), in a tread surface (2). A land portion (B) surrounded by the circumferential groove (3) and the steep decline portion (4a) has an acute corner portion (12) and an obtuse corner portion (13), each being formed between the circumferential groove (3) and the steep decline portion (4a). An outer groove wall surface (6) of the circumferential groove (3) includes a gentle decline wall (6a) in the tread surface side, and a steep decline wall (6b) in the groove bottom side.

10 Claims, 12 Drawing Sheets

CROSS SECTIONAL VIEW ALONG LINE A-A'

CROSS SECTIONAL VIEW ALONG LINE B-B'

CROSS SECTIONAL VIEW ALONG LINE C-C'

CROSS SECTIONAL VIEW ALONG LINE D-D'

PNEUMATIC TIRE HAVING CIRCUMFERENTIAL GROOVES AND OBLIQUE GROOVES

BACKGROUND OF THE INVENTION

1. Field of the Invention

The present invention relates to a pneumatic tire which has, on balance, an improved drainage performance, dry grip performance and wear resistance performance.

2. Description of the Related Art

As the pneumatic tire in which the dry grip performance and the drainage performance are improved, for example, there has been known a tire described in Japanese Unexamined Patent Publication No. 2004-210189. This pneumatic tire has a tread face with a tread pattern which is provided with a circumferential groove (g1) extending in a tire circumferential direction, and a plurality of oblique grooves (g2) extending from the circumferential groove (g1) toward tread edges at a comparatively small angle with respect to the tire circumferential direction as shown in FIG. 11.

In the tread pattern mentioned above, a land portion (r) is formed in a region adjacent to the circumferential groove (g1) and between the oblique grooves (g2 and g2). The land portion (r) includes an acute corner portion (c1) with an acute corner formed between the circumferential groove (g1) and one oblique groove (g2) delimiting such land portion (r), and an obtuse corner portion (c2) with an obtuse corner formed between the circumferential groove (g1) and another oblique groove (g2) delimiting such land portion (r). Such a land portion (r), however, may not exhibit a rigidity which is necessary at a time of cornering in the acute corner portion (c1). Accordingly, there is further room for improvement about an improvement of a steering stability such as a reduction of the dry grip performance and the like. Further, there is a defect that an uneven wear tends to be generated near the acute corner portion (c1).

SUMMARY OF THE INVENTION

An object of the present invention is to provide a pneumatic tire which can improve a drainage performance, a dry grip performance and an uneven wear resistance performance with a good balance, on the basis of an improvement of a groove wall surface of a circumferential groove.

Means for Solving the Problem

In accordance with a first aspect of the present invention, there is provided a pneumatic tire wherein a tread surface comprises:

a pair of circumferential grooves continuously extending in a tire circumferential direction in both sides of a tire equator;

a plurality of oblique grooves having a steep decline portion extending to an outer side in a tire axial direction while being inclined at an angle between 15 and 45 degree with respect to the tire circumferential direction from a position apart from the circumferential groove at a small distance, and provided away from each other in the tire circumferential direction; and a land portion surrounded by the circumferential groove and the steep decline portion adjacent thereto in the tire circumferential direction, wherein the land portion has an acute corner portion between the circumferential groove and the steep decline portion, and an obtuse corner portion between the circumferential groove and the steep decline portion, wherein an outer groove wall surface in an outer side in a tire axial direction of the circumferential groove comprises:

a gentle decline wall surface extending from a nodal line in which the outer groove wall surface and the tread surface intersect, toward an inner side in a tire radial direction so as to be inclined to an inner side in the tire axial direction; and a steep decline wall extending from an inner end in the tire radial direction of the gentle decline wall to a groove bottom side, wherein the inner end of the gentle decline wall is formed in a wavy shape in which an inclined surface width corresponding to a distance in the tire axial direction from the inner end to the nodal line repeats increasing and decreasing in the tire circumferential direction, and wherein an innermost point of the inner end at which the inclined surface width becomes maximum is positioned in a region between an intermediate position between a leading end of the acute corner portion and a leading end of the obtuse corner portion, and the leading end of the acute corner portion.

It is preferable that the distance in the tire circumferential direction between the innermost point of the inner end and the leading end of the acute corner portion is 10 to 45% of the distance in the tire circumferential direction between the leading end of the acute corner portion and the leading end of the obtuse corner portion.

It is preferable that the small distance is 0.5 to 1.2% of a tread ground width.

It is preferable that the nodal line is formed in a linear shape along the tire circumferential direction.

It is possible to form the inner end in a wavy shape, by fixing a depth in the tire radial direction from the tread surface to the inner end of the gentle decline wall, and changing an angle of the gentle decline wall with respect to a tire normal line. Further, it is possible to form the inner end in a wavy shape, by changing a depth in the tire radial direction from the tread surface to the inner end of the gentle decline wall, and fixing the angle of the gentle decline wall with respect to the tire normal line.

It is preferable that the gentle decline wall is provided with a plurality of small grooves for a thermal diffusion having a groove width equal to or less than 1.2 mm away from each other in the tire circumferential direction.

It is preferable that an inner groove wall surface in the inner side in the tire axial direction of the circumferential groove comprises:

a gentle declined wall extending from a nodal line in which the inner groove wall surface and the tread surface intersect, toward an inner side in the tire radial direction so as to be inclined to an outer side in the tire axial direction; and a steep decline wall extending from an inner end in the tire radial direction of the gentle decline wall to a groove bottom side, and wherein the inner end of the inner groove wall surface extends in the tire circumferential direction with a wavy shape which is substantially in parallel to the inner end of the outer groove wall surface.

It is preferable that the tread surface is provided with a narrow groove having a groove width smaller than the circumferential groove and extending in the tire circumferential direction, in an outer side in the tire axial direction of the circumferential groove, and a width in the tire axial direction between the narrow groove and the circumferential groove is set to 18 to 30% of the tread ground width.

In the present specification, the "tread ground width" means a maximum distance in the tire axial direction between tread ground ends at a time of setting an equation camber angle α=0 degree and applying a normal load so as to press the tire to a flat surface, in a normal internal pressure state in which the tire is assembled in a normal rim and a normal internal pressure is charged.

The "normal rim" corresponds to a rim defined per tire by a standard system including a standard on which the tire is based, and, for example, means a standard rim in JATMA, "Design Rim" in TRA, or "Measuring Rim" in ETRTO.

The "normal internal pressure" corresponds to an air pressure defined per tire by each of the standards in the standard system including the standard on which the tire is based, is set to a maximum air pressure in JATMA, a maximum value described in a table "TIRE LOAD LIMITS AT VARIOUS COLD INFLATION PRESSURES" in TRA, and "INFLATION PRESSURE" in ETRTO, and is set uniformly to 180 kPa in the case that the tire is for a passenger car.

The "normal load" corresponds to a load defined per tire by each of the standards in the standard system including the standard on which the tire is based, is set to a maximum load capacity in JATMA, a maximum value described in table "TIRE LOAD LIMITS AT VARIOUS COLD INFLATION PRESSURES" in TRA, and "LOAD CAPACITY" in ETRTO, and means a load corresponding to 88% of the load in the case that the tire is for the passenger car.

Effect of the Invention

The pneumatic tire in accordance with the present invention is structure as mentioned above. Accordingly, in an acute corner portion between the circumferential groove and the oblique groove in the land portion surrounded by the circumferential groove and the inclined groove, a rigidity is increased by the gentle decline wall of the circumferential groove in which the inclined surface width becomes large. Accordingly, it is possible to improve the dry grip performance, the wear resistance performance and the like. Further, the steel decline wall of the circumferential groove secures a large groove volume and maintains an improved drainage performance.

DETAILED DESCRIPTION OF THE PREFERRED EMBODIMENTS

A description will be given below of a best mode for carrying out the present invention on the basis of the accompanying drawings.

Figure 1:
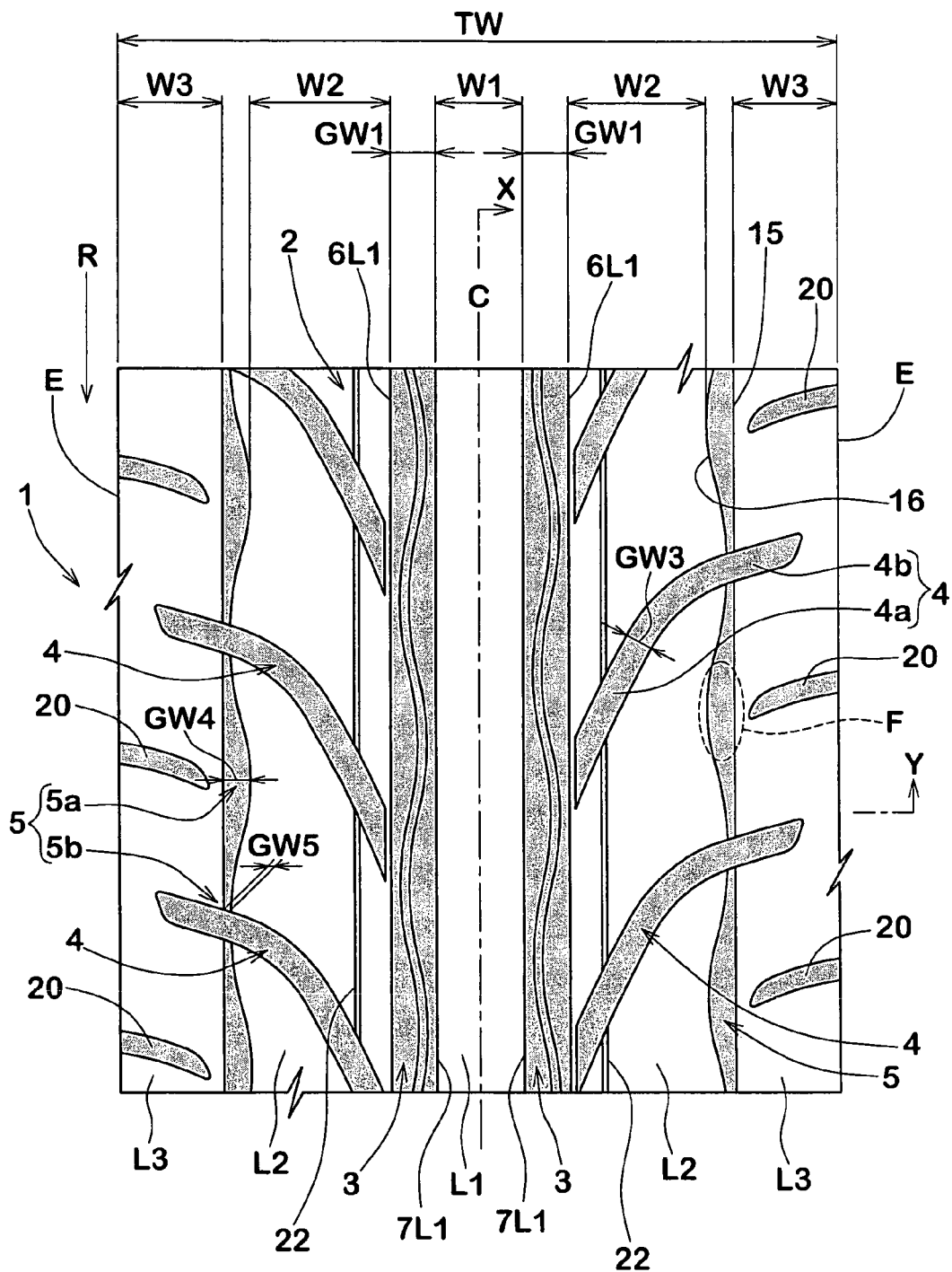
FIG. 1 is an expansion plan view of a tread portion and shows an embodiment of a pneumatic tire in accordance with the present invention.
Figure 2:
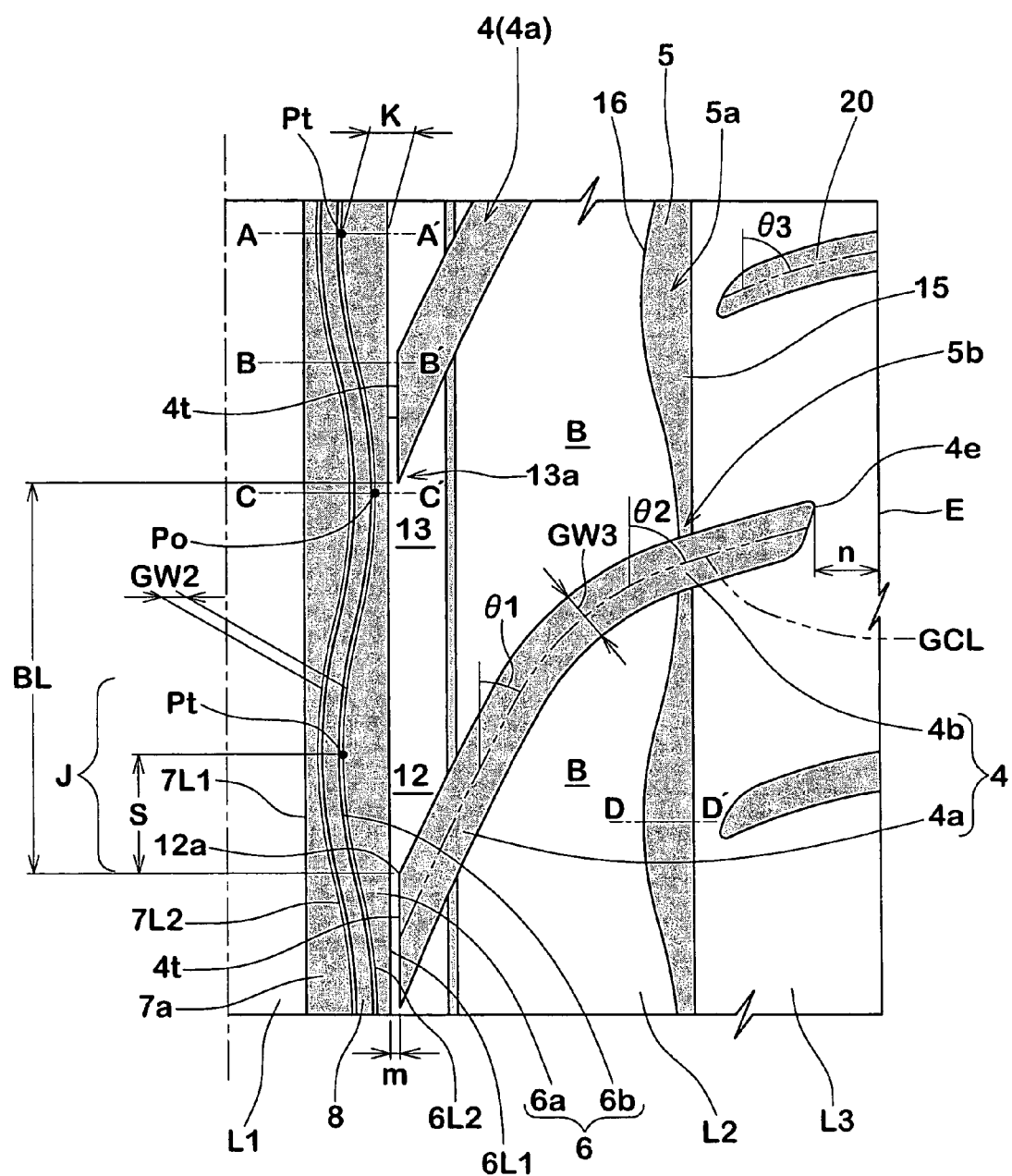
FIG. 2 is an enlarged view showing a portion along a line X-Y in the expansion plan view.

FIG. 1 is an expansion plan view of a tread portion and shows an embodiment of a pneumatic tire in accordance with the present invention. FIG. 2 is an enlarged view showing a portion along a line X-Y in FIG. 1. The pneumatic tire in accordance with the present invention is not regulated by a category of the tire and an internal structure thereof, but is preferably carried out particularly as a tire for a passenger car.

As shown in FIG. 1, on a tread surface 2 of a pneumatic tire 1, there are mainly formed a pair of circumferential grooves 3 continuously extending in a tire circumferential direction in both sides of a tire equator C, a plurality of oblique grooves 4 provided away from each other in the tire circumferential direction and extending from a portion near the circumferential groove 3 so as to be inclined to the tire circumferential direction, and a pair of narrow grooves 5 arranged in an outer side in a tire axial direction of the circumferential groove 3 and extending in the tire circumferential direction. Accordingly, on the tread surface 2, there are formed a center land portion L1 between the circumferential grooves 3 and 3, a middle land portion L2 between the circumferential groove 3 and the narrow groove 5, and a shoulder land portion L3 between the narrow groove 5 and a tread ground end E.

Figure 3A:
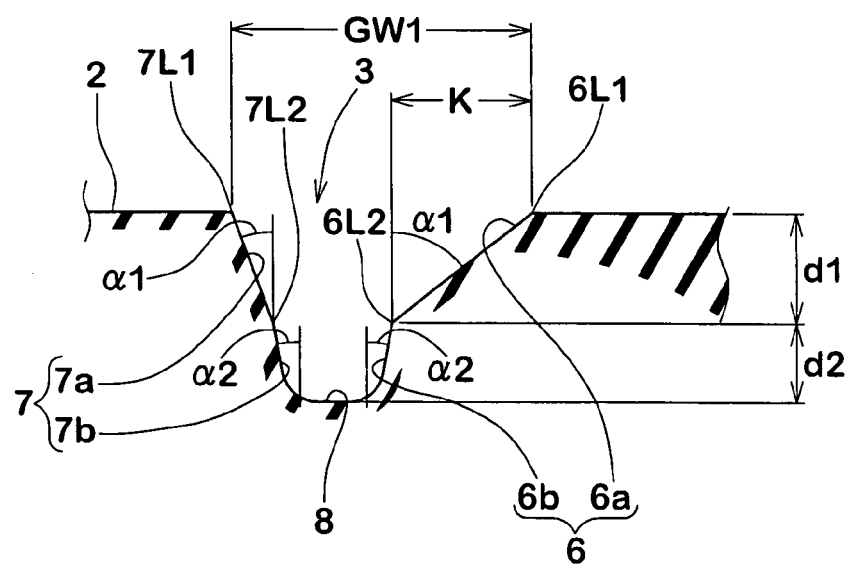
FIG. 3(A) is a cross sectional view of a circumferential groove at a position A-A' in FIG. 2.
Figure 3B:
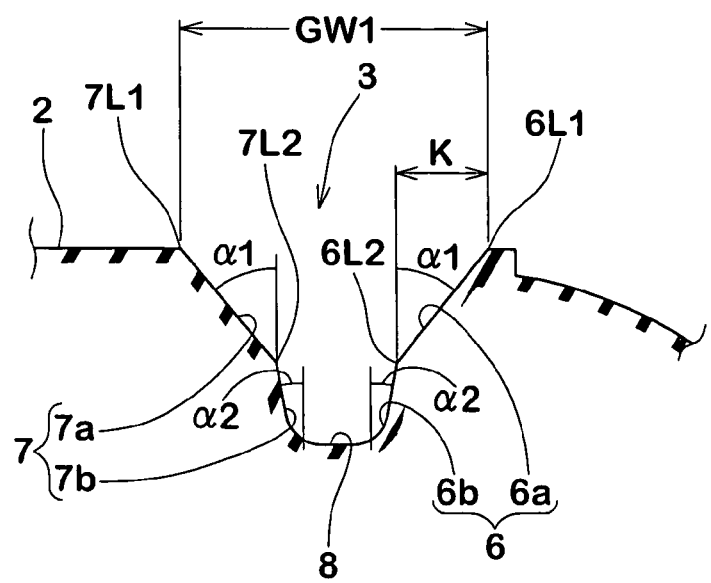
FIG. 3(B) is a cross sectional view of the circumferential groove at a position B-B' in FIG. 2.
Figure 3C:
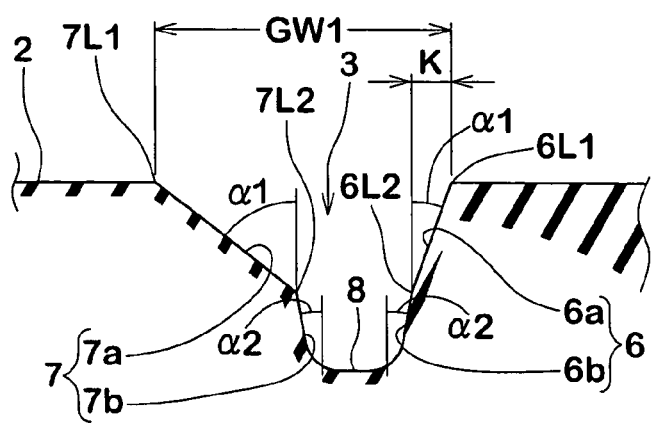
FIG. 3(C) is a cross sectional view of the circumferential groove at a position C-C' in FIG. 2.

The circumferential groove 3 is arranged in both sides of the tire equator C, and continuously extends in the tire circumferential direction. In the present example, the circumferential grooves 3 and 3 are formed at substantially symmetrical positions around the tire equator C. FIGS. 3(A) to 3(C) show cross sectional views of the circumferential groove 3 at a position along a line A-A', a position along a line B-B' and a position along a line C-C' in FIG. 2. The circumferential groove 3 has an outer groove wall surface 6 positioned in an outer side in the tire axial direction, an inner groove wall surface 7 in an inner side in the tire axial direction facing thereto, and a groove bottom 8 between them.

The outer groove wall surface 6 includes a gentle decline wall 6a extending from a nodal line 6L1 between the outer groove wall surface 6 and the tread surface 2 toward an inner side in a tire radial direction so as to be inclined to the inner side in the tire axial direction, and a steep decline wall 6b extending from an inner end 6L2 in the tire radial direction of the gentle decline wall 6a to the groove bottom side.

The nodal line 6L1 continuously extends linearly along the tire circumferential direction. Further, in the gentle decline wall 6a, an angle α1 with respect to a tire normal line is, for example, in a range between 20 and 60 degree. As is apparent from FIGS. 2 and 3(A) to 3(C), in the present example, the angle α1 of the gentle decline wall 6a is changed in the range. In other words, the gentle decline wall 6a is structured by a smoothly wavy three-dimensional curved surface.

Figure 4A:
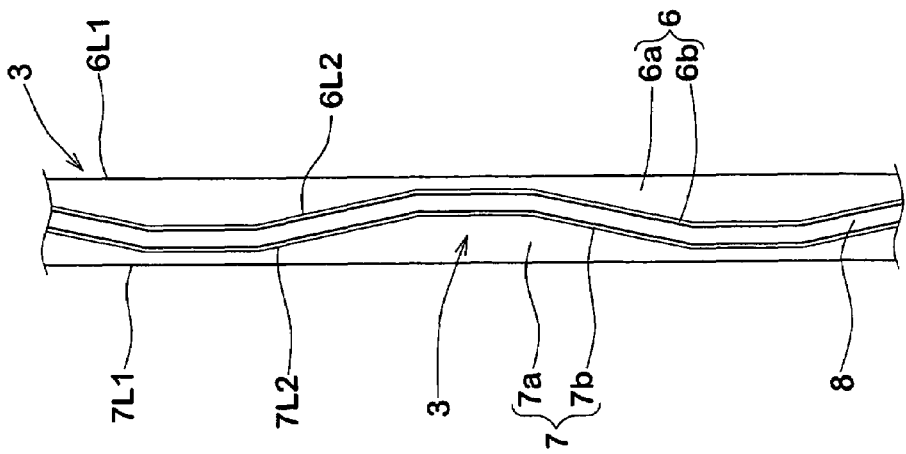
FIGS. 4(A) to 4(C) are plan views showing the other embodiment of the circumferential groove.
Figure 4B:
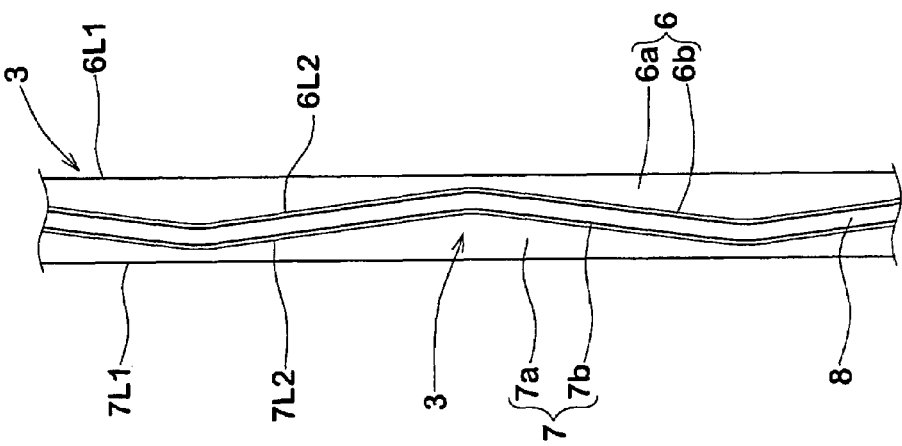
Figure 4C:
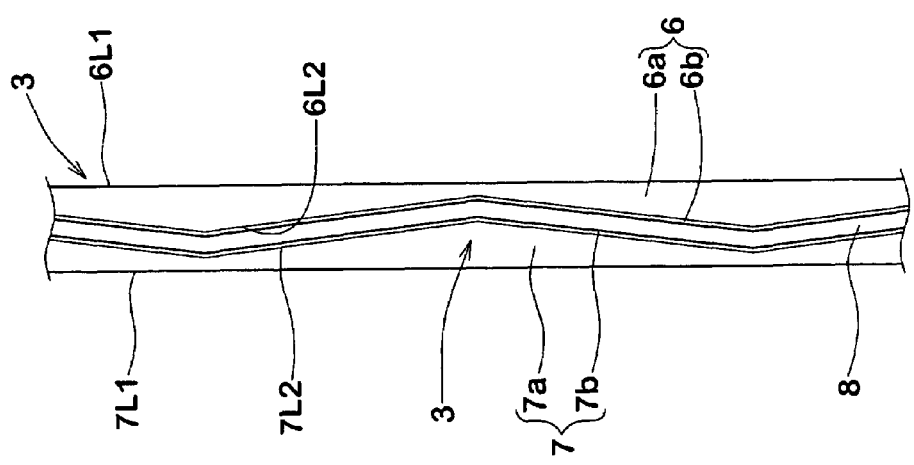

Further, in the present example, a depth d1 in the tire radial direction of the gentle decline wall 6a is substantially fixed in the tire circumferential direction. In the inner end 6L2 of the gentle decline wall 6a, an inclined wall width K corresponding to a distance in the tire axial direction to the nodal line 6L1 repeats increasing and decreasing in the tire circumferential direction, on the basis of the increasing and decreasing change of the angle α1 and the fixed depth d1. Accordingly, the inner end 6L2 of the gentle decline wall 6a shows a wavy shape as is apparent from a plan view. The "wavy shape" mentioned above includes various shapes such as a zigzag shape based on a straight line as shown in FIG. 4(A), an approximately zigzag shape formed by combining a straight line and a circular arc as shown in FIG. 4(B), a trapezoidal wavy shape as shown in FIG. 4(C), or the like, as well as a sine wave shape as in the present example.

Further, the steel decline wall 6b extends to an inner side in a radial direction from the inner end 6L2 of the gentle decline wall 6a. A direction of an incline of the steep decline wall 6b is the same as that of the gentle decline wall 6a. Further, an angle $\alpha 2$ of the steep decline wall 6b with respect to the tire normal line is, for example, between 3 and 15 degree. Accordingly, an angle of the steep decline wall 6b is smaller than the gentle decline wall 6a, and the steep decline wall 6b forms a steep inclined surface. Further, a depth d2 of the steep decline wall 6b in the tire radial direction is formed substantially fixed in the tire circumferential direction in the present example. In this case, the steep decline wall 6b and the groove bottom 8 are smoothly connected, for example, via a circular arc portion.

Further, the inner groove wall surface 7 in the inner side in the tire axial direction of the circumferential groove 3 is provided with approximately the same structure as the outer groove wall surface 6. In other words, the inner groove wall surface 7 includes a gentle decline wall 7a extending from a nodal line 7L1 between the inner groove wall surface 7 and the tread surface 2 toward the inner side in the tire radial direction, and a steep decline wall 6b extending from an inner end 7L2 in the tire radial direction of the gentle decline wall 7a to the groove bottom side. The steep decline wall 7b and the groove bottom 8 are smoothly connected via a circular arc portion.

The nodal line 7L1 continuously extends linearly along the tire circumferential direction. Further, the angle $\alpha 1$ of the gentle decline wall 7a and the angle $\alpha 2$ of the steep decline wall 7b are set within the same angular range as that of the outer groove wall surface 6. Further, the inner end 7L2 of the gentle decline wall 7a extends in the tire circumferential direction in a substantially parallel wavy shape to the inner end 6L2 of the outer groove wall surface 6, in a plan view. Accordingly, a width GW2 (shown in FIG. 2) in the tire axial direction between the inner end 6L2 of the outer groove wall surface 6 and the inner end 7L2 of the inner groove wall surface 7 is substantially fixed.

Since the circumferential groove 3 is arranged in both sides of the tire equator C having a high ground contact pressure, the circumferential groove 3 gives a great influence to a rigidity of the tread surface 2 and a drainage performance. Accordingly, if the groove width GW1 of the circumferential groove 3 corresponding to a distance in the tire axial direction between the nodal lines 6L1 and 7L1 is too large, there is a tendency that a dry grip performance is deteriorated. On the contrary, if it is too small, there is a tendency that a sufficient wet grip performance can not be obtained. From this point of view, a lower limit value of the groove width GW1 of the circumferential groove 3 is preferably equal to or more than 4% of the tread ground width TW, and further preferably equal to or more than 5%. Further, an upper limit value is preferably equal to or less than 8% of the tread ground width TW, and further preferably equal to or less than 6%. Further, the groove depth (d1+d2) is preferably equal to or more than 5 mm, and further preferably equal to or more than 6 mm, and an upper limit value is preferably equal to or less than 10 mm, and further preferably equal to or less than 9 mm. Further, the width GW2 between the steep decline walls 6b and 7b is preferably equal to or more than 30% of the width GW1 of the circumferential groove 3, and further preferably equal to or more than 40%, and an upper limit value is preferably equal to or less than 60% of the width GW1, and further preferably equal to or less than 50%.

In this case, in the pneumatic tire 1 mentioned above, no groove is formed between the circumferential grooves 3 and 3. Accordingly, the center land portion L1 is formed by a straight rib continuously extending in the tire circumferential direction. Since the straight rib is provided with a high rigidity, the straight rib serves for achieving a great dry grip performance. If the width W1 in the tire axial direction of the center land portion L1 is too small, a sufficient pattern rigidity can not be obtained, and on the contrary, if it is too large, the drainage performance tends to be lowered. From this point of view, the width W1 of the center land portion L1 is preferably equal to or more than 10% of the tread ground width TW in the normal internal pressure state, and further preferably equal to or more than 12%, and an upper limit value is preferably equal to or less than 18%, and further preferably equal to or less than 16%.

Next, the oblique groove 4 has a leading end 4t at a position at a distance of small distance m to an outer side in the tire axial direction from the nodal line 6L1 of the circumferential groove 3, and extends to the outer side in the tire axial direction from the leading end 4t so as to be inclined, as shown in FIG. 2. The oblique grooves 4 are provided away from each other in the tire circumferential direction at a fixed or random pitch. The oblique groove 4 in accordance with the present example extends so as to go beyond the narrow groove 5 to the outer side in the tire axial direction. Accordingly, the middle land portion L2 is formed as an example of a substantially segmented rhombic block B in the present example, by the oblique groove 4.

If the small distance m is too small, a reduction of a pattern rigidity tends to be generated, and if it is too large, there is a tendency that the drainage performance is deteriorated. From this point of view, the small distance m is preferably equal to or more than 0.5% of the tread ground width TW, and further preferably equal to or more than 0.8%. Further, an upper limit value is preferably equal to or less than 1.5% or less of the tread ground width TW, and further preferably equal to or less than 1.2%.

Further, the oblique groove 4 includes a steep decline portion 4a inclined at an angle $\theta 1$ between 15 and 45 degree with respect to the tire circumferential direction from the leading end 4t and extending to the outer side in the tire axial direction, and a gentle decline portion 4b connected to the outer side in the tire axial direction of the steep decline portion 4a and inclined at an angle $\theta 2$ larger than 45 degree with respect to the tire circumferential direction. Accordingly, since the steep decline portion 4a near the tire equator side is inclined at the small angle equal to or less than 45 degree with respect to the tire circumferential direction, it is possible to obtain a high drainage performance. In particular, the angle $\theta 1$ is preferably equal to or less than 40 degree, further preferably equal to or less than 35 degree, and more preferably equal to or less than 30 degree.

On the other hand, since the gentle decline portion 4b provided in the tread ground end E side is inclined at the large angle $\theta 2$, the gentle decline portion 4b serves for preventing the rigidity reduction of the land portion in the tread ground end E side to which a great side force is applied. From this point of view, the angle $\theta 2$ is preferably equal to or more than 50 degree, and further preferably equal to or more than 60 degree, and an upper limit value is equal to or less than 130 degree, and further preferably equal to or less than 120 degree.

Further, the outer end portion 4e in the tire axial direction of the oblique groove 4 is terminated at an inner side in the tire axial direction without reaching the tread ground end E. Accordingly, it is possible to maintain the rigidity of the shoulder land portion L3 high, and a steering stability is improved. A distance n in the tire axial direction between the outer end portion 4e of the oblique groove 4 and the tread ground end E is preferably, for example, 2% of the tread ground width TW, and further preferably equal to or more than 4%. Further, an upper limit value thereof is preferably equal to or less than 8% of the tread ground width TW, and further preferably equal to or less than 6%.

In this case, the angle of incline of the groove with respect to the tire circumferential direction is defined in accordance with the angle formed by the center line of the groove width and the tire circumferential direction. Further, the groove width is measured on the tread surface 2, however, in the case that the groove wall and the tread surface are connected via a circular arc, the groove width is defined between intersections determined between a virtual extension of the groove wall and a virtual extension of the tread surface.

If the groove width GW3 of the oblique groove 4 is too large, the groove width GW3 lowers a pattern rigidity, and there is a tendency that the dry grip performance is deteriorated. On the contrary, if it is too small, there is a tendency that a sufficient wet grip performance can not be obtained. From this point of view, the groove width GW3 of the oblique groove 4 is preferably equal to or more than 2.5% of the tread ground width TW, and further preferably equal to or more than 3.5%. Further, an upper limit value thereof is preferably equal to or less than 6.5% of the tread ground width TW, and further preferably equal to or less than 5.5%.

Figure 5:
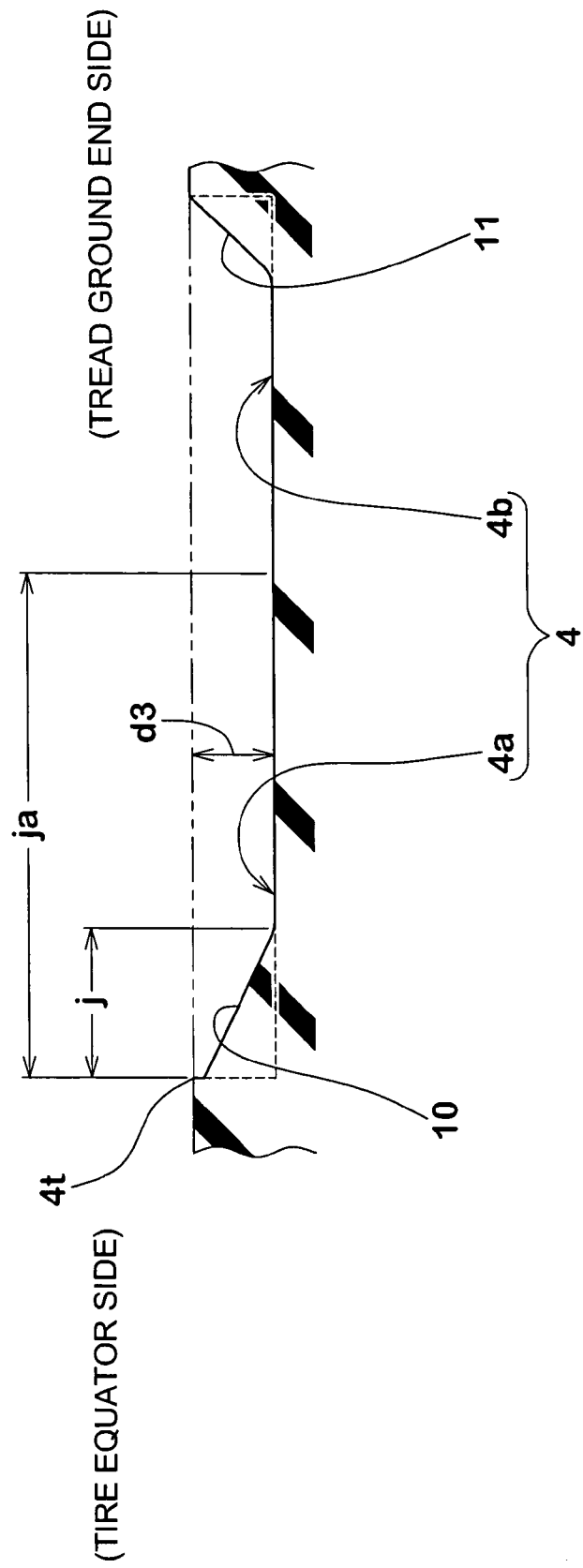
FIG. 5 is a cross sectional view along a groove center line of an inclined groove.

Further, FIG. 5 shows an end elevational view along a groove width center line GCL of the oblique groove 4. In the present example, the oblique groove 4 has a bottom advance portion 10 in which a groove depth is made smaller step by step toward the leading end 4t, in the leading end 4t side of the steep decline portion 4a. The bottom advance portion 10 mentioned above serves for preventing a generation of a rubber short or an uneven wear or the like in addition to increasing a rigidity of the land portion having the small width between the bottom advance portion 10 and the circumferential groove 3, increasing the dry grip performance and the like. A length j along the groove width center line GCL of the bottom advance portion 10 is preferably in a range between 10 and 30% of the groove length ja of the steep decline portion 4a, further preferably in a range between 15 and 25%. In this case, in the present example, a bottom advance portion 11 having a smaller length is provided in the outer end portion 4e side of the oblique groove 4. In this case, a groove depth d3 of the oblique groove 4 is preferably equal to or more than 5 mm, and further preferably equal to or more than 6 mm, and an upper limit value is preferably equal to or less than 10 mm, and further preferably equal to or less than 9 mm.

Further, the narrow groove 5 extending in the tire circumferential direction is formed in the outer side in the tire axial direction of the circumferential groove 3. A width W2 in the tire axial direction between the narrow groove 5 and the circumferential groove 3, that is, the width W2 in the tire axial direction of the middle land portion L2 on the tread surface 2 is set to 18 to 30% of the tread ground with TW. In the case that an inner groove edge 16 in an inner side in the tire axial direction of the narrow groove 5 is formed in a wavy shape as in the present example, a minimum value of the width W2 in the tire axial direction is set to the range mentioned above. The narrow groove 5 mentioned above applies a flexibility to an outer region of the circumferential groove 3, inhibits a heat generation, and can improve a grip performance.

The groove width of the narrow groove 5 is formed smaller than the groove width GW1 of the circumferential groove 3. This serves for maintaining the rigidity of the land portions L2 and L3 positioned in the tire axial direction than the circumferential groove 3 relatively high, and generating a great side force. Further, the narrow groove 5 in accordance with the present embodiment intersects the gentle decline portion 4b of the oblique groove 4 as mentioned above.

The shoulder land portion L3 is provided with a lug groove 20 which is inclined in the same direction as that of the oblique groove 4 at a comparatively large angle θ3 (shown in FIG. 2) with respect to the tire circumferential direction. The lug groove 20 extends to an outer side in the tire axial direction while going beyond the tread ground end E from an inner end position apart from the narrow groove 5. Further, the lug groove 20 is provided approximately at an intermediate position between the adjacent oblique grooves 4 and 4 in the tire circumferential direction. Accordingly, the shoulder land portion L3 continuously extends in the tire circumferential direction in the zigzag shape, suitably softens a rigidity thereof and can balance the drainage performance with the dry grip performance. From this point of view, the angle θ3 of the lug groove 20 is preferably in a range between 45 and 85 degree. In particular, it is preferable to make the angle θ3 substantially equal to the angle θ2 of the gentle decline portion 4b of the oblique groove 4.

Further, since the tread pattern is structured in the manner mentioned above, in the present example, the middle land portion L2 is sectionalized substantially into blocks B surrounded by the circumferential groove 3, the oblique grooves 4 and 4 adjacent in the tire circumferential direction and the narrow groove 5. Further, in the block B, there are formed an acute corner portion 12 between the nodal line 6L1 of the circumferential groove 3 and the steep decline portion 4a of the oblique groove 4, and an obtuse corner portion 13 between the nodal line 6L1 of the circumferential groove 3 and the steep decline portion 4a of the oblique groove 4.

Further, in the pneumatic tire 1 in accordance with the present invention, as shown in FIG. 2, an innermost point Pt in the inner end 6L2 of the outer groove end surface 6 having a largest inclined surface width K of the steep decline wall 6a is positioned in a region J between an intermediate position between a leading end 12a of the acute corner portion 12 and a leading end 13a of the obtuse corner portion 13, and the leading end 12a of the acute corner portion 12.

In the conventional pneumatic tire, the land portion rigidity of the acute corner portion 12 in the middle land portion L2 is significantly lower in comparison with the obtuse corner portion 13, and this portion forms the weak point so as to generate the short of dry grip and the uneven wear, as mentioned above. Accordingly, in the present invention, the rigidity of the acute corner portion 12 is increased by making the inclined surface width K of the gentle decline wall 6a largest near the acute corner portion 12 having the small rigidity, as is apparent from FIGS. 1, 2 and 6 (a partial perspective view of FIG. 2). Accordingly, the rigidity of the middle land portion L2 is uniformized, and it is possible to effectively prevent the periodical reduction of the grip force generated in the acute corner portion 12, and the generation of the uneven wear.

In this case, there is a tendency that a rigidity improving effect in the corner portion 12 is reduced whichever the innermost point Pt is too close to the leading end 12a of the acute corner portion 12 or too apart therefrom. Accordingly, in order to obtain a sufficient rigidity improving effect, the distance S in the tire circumferential direction between the innermost point Pt and the leading end 12a of the acute corner portion 12 is preferably equal to or less than 45% of a distance BL in the tire circumferential direction between the leading ends 12a and 13a, and further preferably equal to or less than 40%, and a lower limit value thereof is preferably equal to or more than 10% and further preferably equal to or more than 20%.

The inclined surface width K of the gentle decline wall 6a is determined for itself by the angle α1 of the gentle decline wall 6a, and the depth d1 in the tire radial direction of the gentle decline wall 6a. A preferable range of the angle α1 is as mentioned above, however, if the depth d1 is too small, the inclined surface width K is also made smaller, and it is impossible to sufficiently increase the rigidity of the acute corner portion 12. On the other hand, if it is too large, the groove volume of the circumferential groove 3 is lowered, and there is a tendency that the drainage performance is deteriorated. From this point of view, the depth d1 of the gentle decline wall 6a is preferably equal to or more than 20% of an entire depth (d1+d2) of the circumferential groove 3, and further preferably equal to or more than 25%. Further, an upper limit value is preferably equal to or less than 70% of the entire depth (d1+d2), and further preferably equal to or less than 65%.

Further, the inner end 6L2 of the gentle decline wall 6a of the outer groove wall surface 6 is structured such that the innermost point Pt and the outermost point Po are repeated in the sine wave shape, and one cycle thereof is set approximately equal to a layout pitch of the oblique grooves 4, in the present example. Accordingly, the effect mentioned above can be obtained in all the blocks B which are arranged in the tire circumferential direction. Further, the outermost point Po in which the inclined surface width K of the inner end 6L2 becomes minimum is arranged in the obtuse corner portion 13 of the block B. Accordingly, the rigidity is not increased in the obtuse corner portion 13 in which the rigidity is originally high.

Further, in general, there has been known that a columnar resonance is generated in the circumferential groove extending in the tire circumferential direction. However, the outer groove wall surface 6 having the wavy inner end 6L2 such as the circumferential groove 3 can reduce a resonance energy.

As mentioned above, the pneumatic tire 1 can improve the drainage performance, the dry grip performance and the wear resistance performance with a good balance, and can contribute to the reduction of the tire noise.

Further, in the pneumatic tire 1 in accordance with the present embodiment, the inner groove wall surface 7 of the circumferential groove 3 is also provided with the same structure as that of the outer groove wall surface 6. However, the inner groove wall surface 7 may be structured such as to have an inner end extending linearly in the tire circumferential direction. In other words, a cross section of the inner groove wall surface 7 can employ an optional shape.

Figure 6:
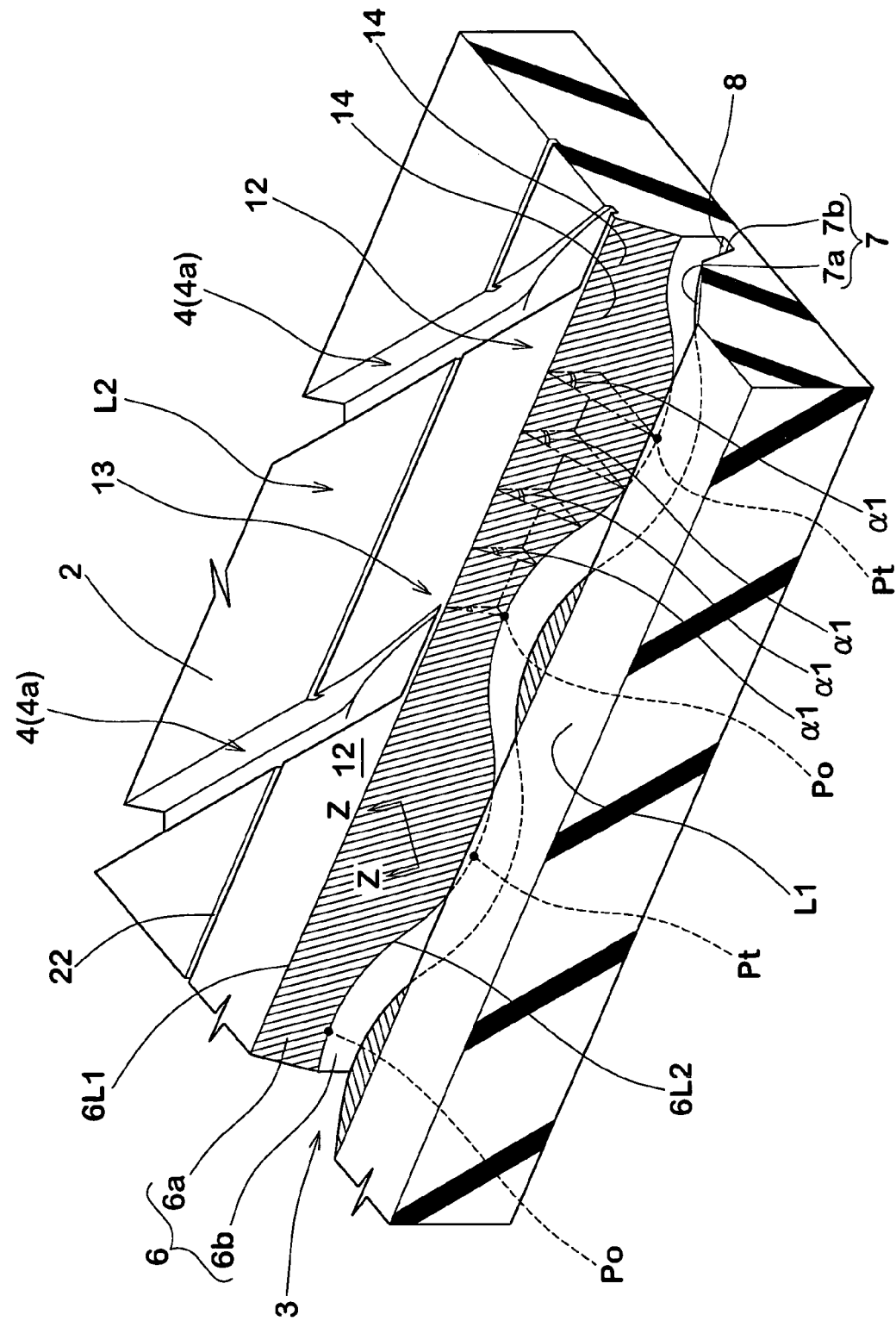
FIG. 6 is a partly perspective view in FIG. 2.
Figure 7:
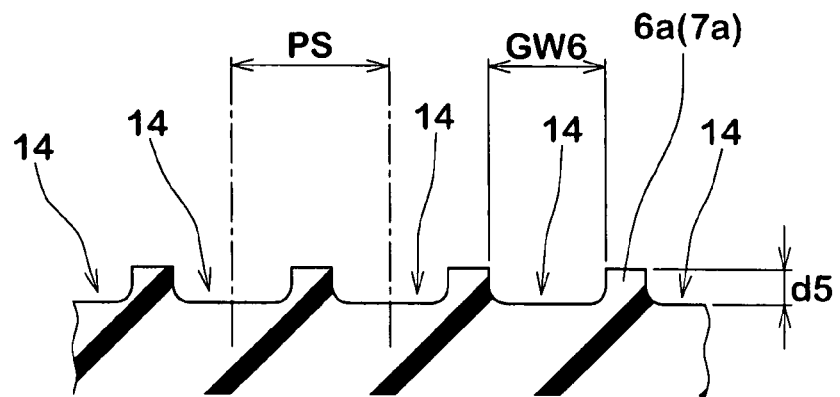
FIG. 7 is a cross sectional view along a line Z-Z in FIG. 6.

Next, a description will be given particularly of a further preferable aspect of the pneumatic tire 1. As shown in FIG. 6 and FIG. 7 corresponding to a cross sectional view along a line Z-Z in FIG. 6, fine grooves 14 for a thermal diffusion having a groove width GW6 equal to or less than 1.2 mm are provided away from each other in the tire circumferential direction, in the gentle decline wall 6a and/or the gentle decline wall 7a of the circumferential groove 3. The fine groove 14 extends from the nodal line 6L1 to the inner end 6L2. The fine groove 14 mentioned above increases a surface area without lowering the rigidity of the gentle decline wall 6a and the gentle decline wall 7a. Accordingly, it is possible to effectively dissipate the heat of the tread portion generated at a time of straight running at a high speed or turning, and it is possible to inhibit a thermal drooping of the tread rubber (that is, a partly festering in the rubber surface due to the heat). Therefore, it is possible to obtain a further higher dry grip performance and steering stability.

In this case, if the groove width GW6 of the fine groove 14 becomes larger than 1.2 mm, the rigidities of the gentle decline wall 6a and the gentle decline wall 7a are lowered. Accordingly, this structure is not preferable. A lower limit value of the groove width GW6 of the fine groove 14 is preferably equal to or less than 0.3 mm in view of a workability. Further, even if the groove depth d5 of the fine groove 14 is too large, the rigidities of the gentle decline wall 6a and the gentle decline wall 7a tend to be lowered. On the contrary, if it is too small, a heat dissipation performance is lowered. From this point of view, the groove depth d5 of the fine groove 14 is preferably set to a range between 0.5 and 2.0 mm.

The fine groove 14 may be in parallel to the tire axial direction, or may be inclined to the tire axial direction. Further, the groove shape is not limited to the linear shape, but may be formed as a curve. Further, the fine grooves 14 are continuously provided away from each other in the tire circumferential direction at a fixed small interval PS, for example, 0.4 to 2.0 mm. If the interval PS becomes more than 2.0 mm, a surface area increasing effect is lowered, and there is a tendency that a sufficient heat dissipation performance can not be obtained. Further, if the interval PS is less than 0.4 mm, the workability is deteriorated. Accordingly, this structure is not preferable. In the case that the fine grooves 14 are continuously provided in the tire circumferential direction at the fixed interval PS, the surface area increasing effect obtained by the fine groove 14 is further increased in the region close to the innermost point Pt of the gentle decline wall 6a in which the surface area per unit circumferential length is large. This is preferable in point of more effectively dissipating the heat of the acute corner portion 12 of the middle land portion L2 which easily generates heat. In this case, in order to further effectively dissipate the heat of the tread surface 2 at a time of running, the middle land portion L2 may be provided with a sipe or a small groove 22 in which both of a width and a depth are in a range between 0.5 and 2.0 mm.

Further, with regard to the narrow groove 5, for example, it is desirable to change the groove width thereof. The narrow groove 5 in accordance with the present example is formed by alternately repeating a wide portion 5a having a larger groove width GW4 and a narrow portion 5b having a smaller groove width GW5 in the tire circumferential direction. The narrow groove has an outer groove edge in the outer side in the tire axial direction, and an inner groove edge 16 in the inner side in the tire axial direction. An expansion and contraction change of the groove width can be obtained, for example, by forming at least one of the outer groove edge 15 and the inner groove edge 16 in the wavy shape. In the present example, the inner groove edge 16 extends in the wavy shape in the tire circumferential direction, and the outer groove edge 15 extends linearly in the tire circumferential direction. Accordingly, the wide portion 5a and the narrow portion 5b are alternately and smoothly repeated in the tire circumferential direction.

Further, as shown in FIG. 1, the uneven wear generally tends to be generated in a region F of the middle land portion L2 close to the inner end of the lug groove 20 in the tire axial direction, due to a rigidity difference. Accordingly, in the present example, the wide portion 5a of the narrow groove 5 is formed in conformity to the inner end position of the lug groove 20 in the tire axial direction. In other words, it is possible to prevent the generation of the uneven wear by removing the region F in which the uneven wear originally tends to be generated, by the wide portion 5a of the narrow groove 5.

Figure 8:
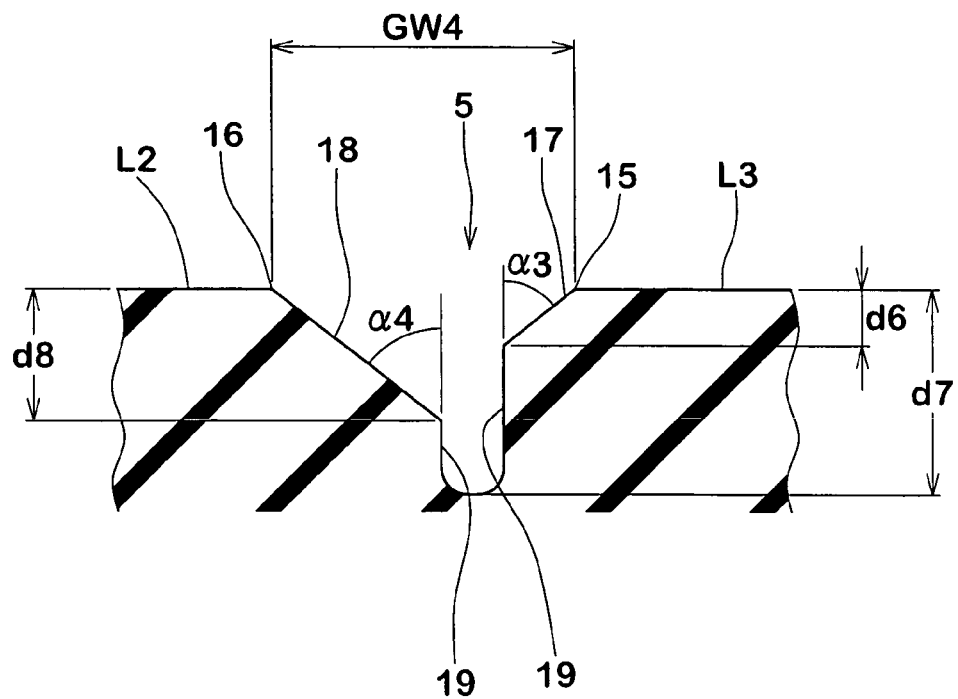
FIG. 8 is a cross sectional view along a line D-D' in FIG. 2.

Further, a cross section of the narrow groove 5 (a cross sectional view along a line D-D' in FIG. 2) is shown in FIG. 8. The narrow groove 5 includes an inclined surface 17 having a gentle decline and inclined at a comparatively large angle α3 such as 30 to 80 degree with respect to the tire normal line, in a groove wall surface in an outer side in the tire axial direction. Accordingly, it is possible to increase a side rigidity of the shoulder land portion L3, and it is possible to improve a steering stability. An inner wall 19 extending along the tire normal line is provided in an inner side in the tire radial direction of the inclined surface 17. It is preferable that a depth d6 in the tire radial direction of the inclined surface 17 is, for example, in a range between 15 and 35% of an entire depth d7 of the narrow groove 5.

In the same manner, the narrow groove 5 includes an inclined surface 18 having a gentle decline and inclined at a comparatively large angle α4 such as 30 to 80 degree with respect to the tire normal line, in a groove wall surface in an inner side in the tire axial direction. Accordingly, it is possible to increase a side rigidity of the middle land portion L2, and it is possible to improve steering stability, in the same manner as mentioned above. The inner wall 19 extending along the tire normal line is provided in an inner side in the tire radial direction of the inclined surface 18. In the present example, it is preferable that a depth d8 in the tire radial direction of the inclined surface 18 is larger than the depth d6, for example, in a range between 40 and 65% of the entire depth d7 of the narrow groove 5.

Figure 9:
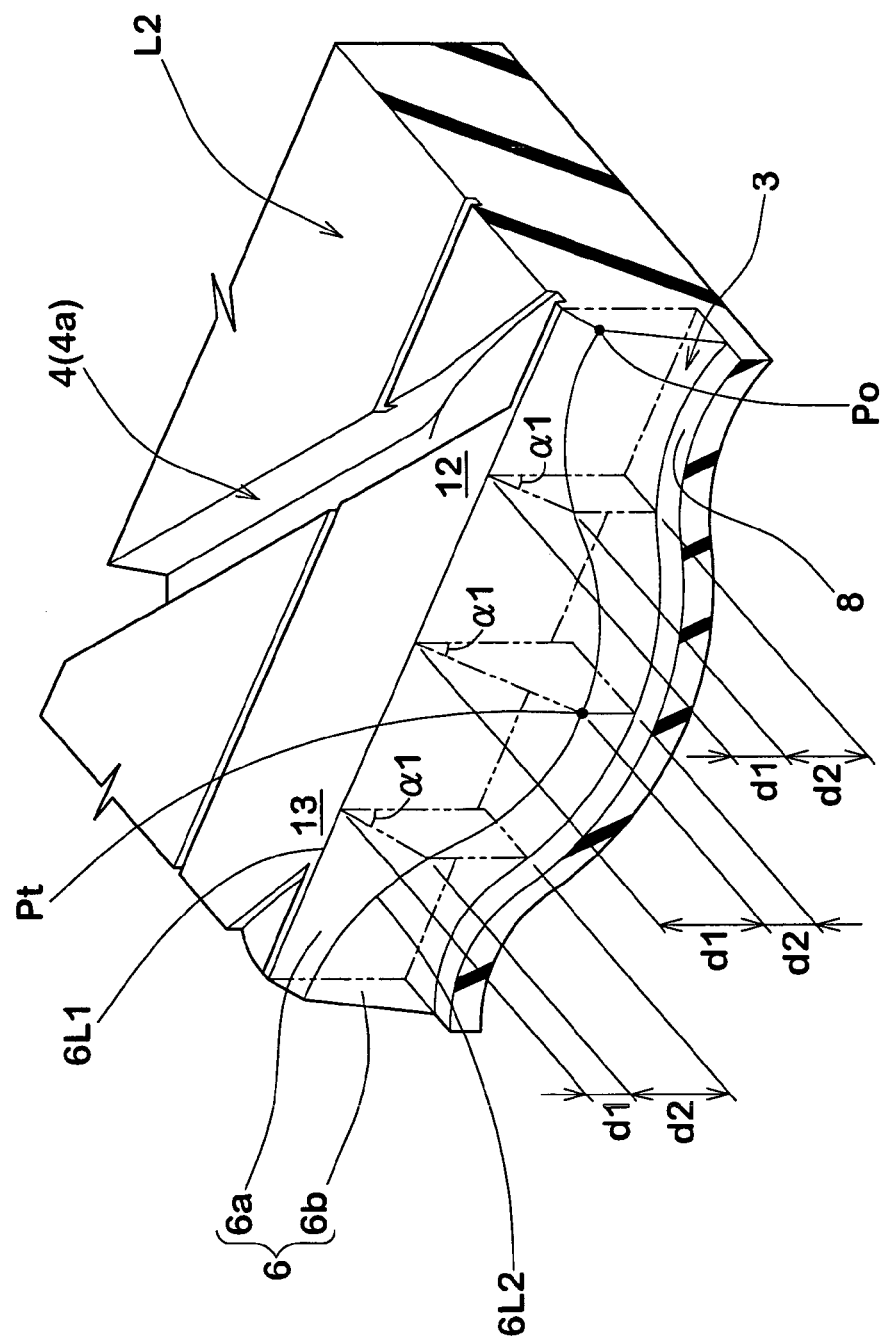
FIG. 9 is a partly perspective view showing the other embodiment of a gentle decline wall.

FIG. 9 shows the other example of the outer groove wall surface 6 of the circumferential groove 3.

In this embodiment, the angle α1 of the gentle decline wall 6a of the outer groove wall surface 6 is fixed in the tire circumferential direction. However, the depth d1 in the tire radial direction of the gentle decline wall 6a, and the depth d2 in the tire radial direction of the steep decline wall 6b are changed in the tire circumferential direction. In this case, a sum (d1+d2) of the depths in the tire radial direction is fixed in the tire circumferential direction. As a result, the inner end 6L2 of the gentle decline wall 6a is formed in the wavy shape in the tire radial direction and the tire circumferential direction.

Figure 10:
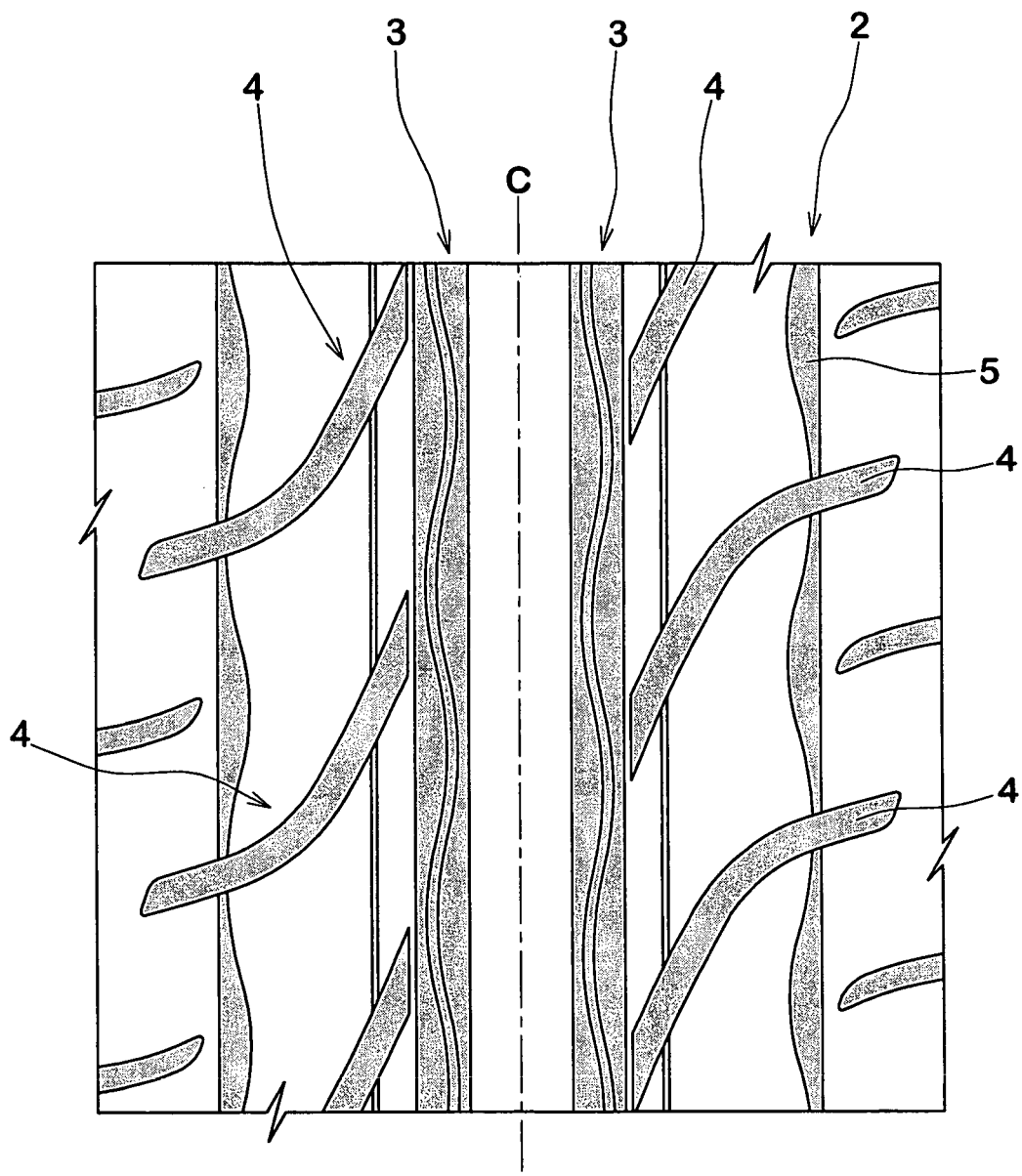
FIG. 10 is an expansion plan view of a tread portion showing the other embodiment in accordance with the present invention.
Figure 11:
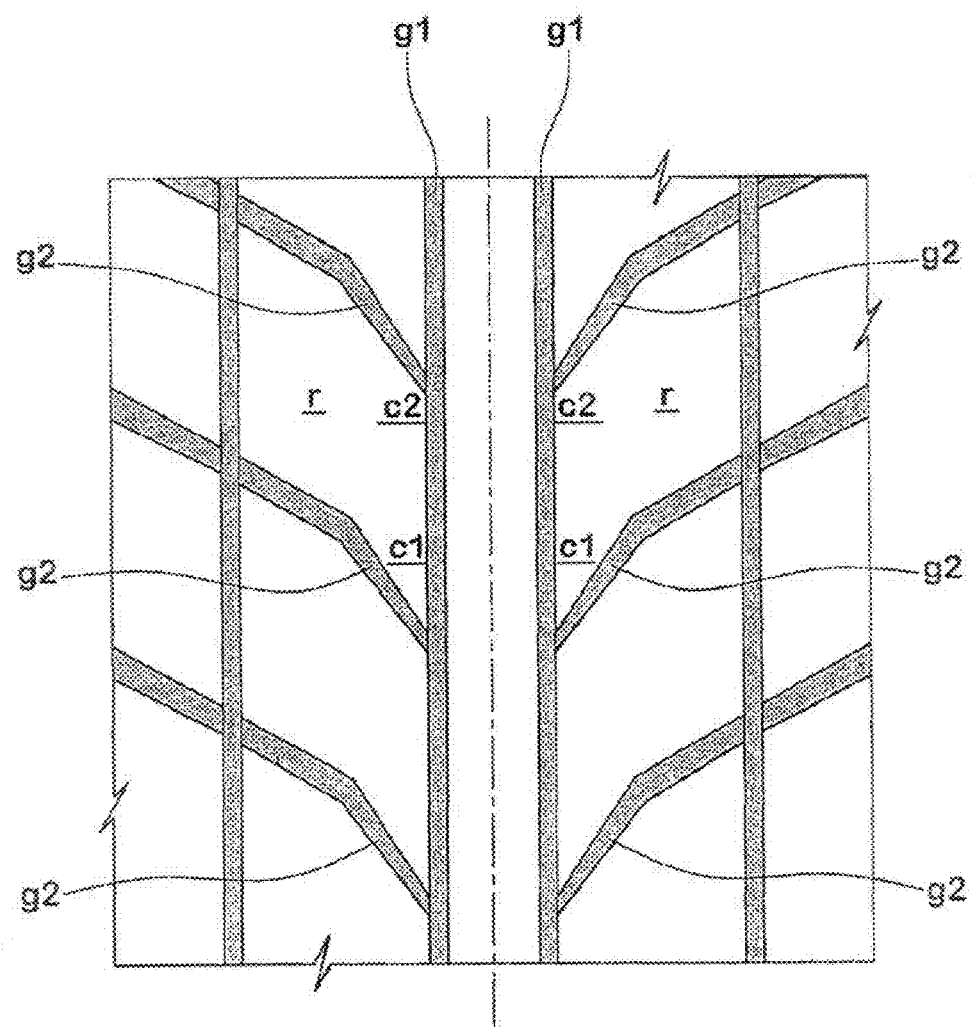
FIG. 11 is an expansion plan view of a conventional tread portion.

FIG. 10 shows further the other example in accordance with the present invention.

In FIG. 1, there is exemplified a directional pattern in which a tire rotating direction R is designated. However, in FIG. 10, there is shown the tread pattern of a non-directional pattern in which the tire rotating direction R is not designated. In particular, in the tread surface 2 in FIG. 10, a right half of the tire equator C is based on the pattern in FIG. 1, however, a left half is formed in a point symmetrical manner around a point on the tire equator C. As mentioned above, the present invention can be carried out in accordance with the various aspects.

EXAMPLES

In order to confirm the effect of the present invention, a radial tire for a passenger car having a tire size of 235/45R17 is manufactured by way of trial, and a dry grip performance, a drainage performance and a biased wear resistance performance of each of the trial tires are tested. In each of the tires, a tread ground width TW is unified to 220 mm, a tread pattern is set in accordance with the specification in Table 1, and a performance difference is compared. In a Comparative Example 1, the inner end of the gentle decline wall of the circumferential groove extends linearly in the tire circumferential direction. In a Comparative Example 2, the inner end of the gentle decline wall of the circumferential wall extends in a wavy shape in the tire circumferential direction. However, the position of the innermost point of the inner end exists in the obtuse corner side of the land portion. Further, in a Comparative Example 3, the steel decline wall is not included in the circumferential wall. In this case, the inner end of the gentle decline wall extends in the wavy shape in the tire circumferential direction. The tests are executed as follows.

<Drainage Performance>

The tire is installed to four wheels of a domestically built 4WD passenger car (displacement 2000 cc), under a condition of rim (8J-17) and internal pressure (200 kPa). Further, the vehicle is moved forward while increasing a speed step by step on a course in which a water pool having a depth of 10 mm and a length of 20 m is provided in an asphalt road surface having a radius of 100 m, a lateral acceleration (a lateral G) is measured, and an average lateral G of front wheels at a speed of 50 to 80 km/h is calculated. Results are displayed by an index number obtained by setting the Comparative Example to 100. The larger the numeral value is, the better the performance is.

<Dry Grip Performance>

A professional driver drives the vehicle mentioned above at a high speed on a circuit, and evaluates in accordance with a sensory evaluation stability at a time of running straight, drive force propagation at a time of accelerating, stability at a time of braking and the like (average value in n=3). Results are displayed by an index number obtained by setting the Comparative Example to 100. The larger the numeral value is, the better the performance is <Biased Wear Resistance Performance>

The vehicle mentioned above runs on a test course of a dry paved road at about 10000 km. A difference of wear amount between the acute corner portion and the obtuse corner portion of the middle land portion is measured at six positions on the tire periphery and an average thereof is determined. Evaluations are displayed by an index number obtained by setting the Comparative Example to 100. The smaller the numeral value is, the smaller the uneven wear is, and the better the performance is.

Results of the tests are shown in Table 1.

TABLE 1

| | | Comparative Example 1 | Comparative Example 2 | Comparative Example 3 | Example 1 | Example 2 | Example 3 | Example 4 | Example 5 | Example 6 |
|---|---|---|---|---|---|---|---|---|---|---|
| Peripheral groove | Groove width GW1 [mm] | | 13.5 | | | 15.5 | | | 13.5 | |
| | Groove width GW2 | | 5.5 | | | 7.5 | | | 5.5 | |

TABLE 1-continued

|  |  | Comparative Example 1 | Comparative Example 2 | Comparative Example 3 | Example 1 | Example 2 | Example 3 | Example 4 | Example 5 | Example 6 |
|---|---|---|---|---|---|---|---|---|---|---|
|  | Groove depth d1 [mm] | 4.0 | 1.5-6.5 | 7.5 |  | 1.5-6.5 |  |  |  | 4.0 |
|  | Groove depth d2 [mm] | 3.5 | 1.0-6.0 | — |  | 1.0-6.0 |  |  |  | 3.5 |
|  | Angle α1 of gentle decline wall (maximum value) [deg] | 45 |  | 25 |  |  | 45 |  |  | 70 |
|  | Angle α1 of gentle decline wall (minimum value) [deg] |  |  |  | 45 |  |  |  |  | 20 |
|  | Angle α2 of steep decline wall (fixed) [deg] | 8 |  | None |  |  | 8 |  |  |  |
|  | Position of innermost point (S/BL) [%] | — | 80 |  |  |  | 30 |  |  |  |
|  | Shape of inner end | Linear shape | Sine wave shape | — |  |  | Sine wave shape |  |  |  |
| Inclined groove | Angle θ1 of steep decline portion [deg] |  |  | 25 |  |  | 15 | 45 | 25 |  |
|  | Angle θ2 of gentle decline portion [deg] |  |  | 65 |  |  | 55 | 85 | 65 |  |
|  | Groove width GW3 [mm] |  |  |  |  | 9.5 |  |  |  |  |
|  | Groove depth d3 [mm] |  |  |  |  | 7.5 |  |  |  |  |
| Fine groove | Groove with GW6 [mm] | — | — | — | — | — | — | — | — | 0.60 |
|  | Groove depth d5 [mm] | — | — | — | — | — | — | — | — | 0.60 |
|  | Pitch PS [mm] | — | — | — | — | — | — | — | — | 0.85 |
| Results | Drainage performance [index] | 100 | 100 | 103 | 100 | 120 | 110 | 90 | 110 | 110 |
|  | Dry grip performance [index] | 100 | 95 | 90 | 110 | 90 | 103 | 115 | 105 | 107 |
|  | Uneven wear resistance performance [index] | 100 | 95 | 90 | 110 | 90 | 103 | 110 | 105 | 105 |

As a result of the tests, it is possible to confirm that the structures in accordance with the examples are improved with a good balance in comparison with the Comparative Examples, in the drainage performance, the dry grip performance and the uneven wear resistance performance.

What is claimed is:

1. A pneumatic tire wherein a tread surface comprises:
a pair of circumferential grooves continuously extending in a tire circumferential direction in both sides of a tire equator;
a plurality of oblique grooves having a steep decline portion extending to an outer side in a tire axial direction while being inclined at an angle between 15 and 45 degrees with respect to the tire circumferential direction from a position apart from a circumferential groove of said pair of circumferential grooves at a small distance, and provided away from each other in the tire circumferential direction; and
a land portion surrounded by said circumferential groove and two of said steep decline portions adjacent thereto in the tire circumferential direction,
wherein said land portion has an acute corner portion between said circumferential groove and one of said steep decline portions, and an obtuse corner portion between said circumferential groove and another of said steep decline portions,
wherein an outer groove wall surface in an outer side in a tire axial direction of said circumferential groove comprises:
a gentle decline wall extending from a nodal line in which the outer groove wall surface and said tread surface intersect, toward an inner side in a tire radial direction so as to be inclined to an inner side in the tire axial direction; and
a steep decline wall extending from an inner end in the tire radial direction of said gentle decline wall to a groove bottom side,
wherein said inner end of said gentle decline wall is formed in a wavy shape in which an inclined surface width corresponding to a distance in the tire axial direction from the inner end to said nodal line repeats increasing and decreasing in the tire circumferential direction, and
wherein each innermost point of the inner end at which said inclined surface width of said gentle decline wall becomes maximum is positioned in a region between a middle position between a leading end of said acute corner portion and a leading end of the obtuse corner portion, and the leading end of said acute corner portion.

2. The pneumatic tire as claimed in claim 1, wherein the distance in the tire circumferential direction between the innermost point of said inner end and the leading end of said acute corner portion is 10 to 45% of the distance in the tire circumferential direction between the leading end of said acute corner portion and the leading end of said obtuse corner portion.

3. The pneumatic tire as claimed in claim 1, wherein said small distance is 0.5 to 1.2% of a tread ground width.

4. The pneumatic tire as claimed in claim 1, wherein said nodal line is formed in a linear shape along the tire circumferential direction.

5. The pneumatic tire as claimed in claim 4, wherein said outer groove wall surface is structured such that a depth in the tire radial direction from said tread surface to the inner end of said gentle decline wall is fixed, and an angle of said gentle decline wall with respect to a tire normal line is changed.

6. The pneumatic tire as claimed in claim 4, wherein said outer groove wall surface is structured such that a depth in the tire radial direction from said tread surface to the inner end of said gentle decline wall is changed, and an angle of said gentle decline wall with respect to the tire normal line is fixed.

7. The pneumatic tire as claimed in claim 1, wherein said gentle decline wall is provided with a plurality of small grooves for a thermal diffusion having a groove width equal to or less than 1.2 mm away from each other in the tire circumferential direction.

8. The pneumatic tire as claimed in claim 1, wherein an inner groove wall surface in the inner side in the tire axial direction of said circumferential groove comprises:

a gentle declined wall extending from a nodal line in which the inner groove wall surface and said tread surface intersect, toward an inner side in the tire radial direction so as to be inclined to an outer side in the tire axial direction; and a steep decline wall extending from an inner end in the tire radial direction of said gentle decline wall to a groove bottom side, and wherein said inner end of said inner groove wall surface extends in the tire circumferential direction with a wavy shape which is substantially in parallel to said inner end of said outer groove wall surface.

9. The pneumatic tire as claimed in claim 1, wherein said tread surface is provided with a narrow groove having a groove width smaller than said circumferential groove and extending in the tire circumferential direction, in an outer side in the tire axial direction of said circumferential groove, and a width in the tire axial direction between said narrow groove and said circumferential groove is set to 18 to 30% of said tread ground width.

10. The pneumatic tire as claimed in claim 1, wherein the outer end portion in the tire axial direction of said oblique groove terminates at an inner side in the tire axial direction of said tread ground end.

* * * * *

UNITED STATES PATENT AND TRADEMARK OFFICE
CERTIFICATE OF CORRECTION

PATENT NO.       : 7,607,464 B2
APPLICATION NO.  : 11/284894
DATED            : October 27, 2009
INVENTOR(S)      : Takehiko Murata It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 637 days.

Signed and Sealed this

Twelfth Day of October, 2010

David J. Kappos
*Director of the United States Patent and Trademark Office*